(12) United States Patent
Suzuki

(10) Patent No.: US 6,711,614 B1
(45) Date of Patent: Mar. 23, 2004

(54) METHOD FOR CARRYING OUT REAL TIME BACKUP COMMUNICATION OF IP COMMUNICATION

(75) Inventor: Mitsuo Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 601 days.

(21) Appl. No.: 09/634,645

(22) Filed: Aug. 8, 2000

(30) Foreign Application Priority Data

Aug. 9, 1999 (JP) ............................................ 11-224868

(51) Int. Cl.$^7$ ............................................ G06F 15/173
(52) U.S. Cl. ..................... 709/224; 709/235; 709/239
(58) Field of Search ................................ 709/224, 223, 709/235, 239; 370/351, 352–356, 354, 357

(56) References Cited

U.S. PATENT DOCUMENTS

| | | | |
|---|---|---|---|
| 4,996,685 A | * 2/1991 | Farese et al. | 370/352 |
| 5,898,668 A | 4/1999 | Shaffer | |
| 6,049,825 A | * 4/2000 | Yamamoto | 709/221 |
| 6,084,874 A | * 7/2000 | Nguyen et al. | 370/352 |
| 6,128,298 A | * 10/2000 | Wootton et al. | 370/392 |
| 6,278,994 B1 | * 8/2001 | Fuh et al. | 707/4 |
| 6,388,988 B1 | * 5/2002 | Jabbarnezhad | 370/228 |
| 6,389,005 B1 | * 5/2002 | Cruickshank | 370/352 |
| 6,430,610 B1 | * 8/2002 | Carter | 709/221 |
| 6,496,477 B1 | * 12/2002 | Perkins et al. | 370/228 |
| 6,510,162 B1 | * 1/2003 | Fijolek et al. | 370/432 |

FOREIGN PATENT DOCUMENTS

| | | | |
|---|---|---|---|
| EP | 0 910 201 | 4/1999 | |
| EP | 0 920 176 | 6/1999 | |
| EP | 0920176 A2 | * 6/1999 | ............ H04M/7/00 |
| EP | 1 035 719 | 9/2000 | |
| EP | 1035719 A2 | * 9/2000 | ............ H04M/7/00 |
| JP | 9-130429 | 5/1997 | |
| JP | 10-65737 | 3/1998 | |
| JP | 10-112739 | 4/1998 | |
| JP | A 10-112739 | 4/1998 | |
| JP | 10-224408 | 8/1998 | |
| JP | 11-308345 | 11/1999 | |
| WO | WO 99/28979 | 6/1999 | |

OTHER PUBLICATIONS

Aras et al., Real–time communication in packet–switched networks, Jan. 1994, IEEE, vol. 82, pp. 122–139.*

Han et al., A primary–backup channel approach to dependable real–time communication in multihop networks, Jan. 1998, IEEE, vol. 47, pp. 46–61.*

Chowdury et al., DRS: A fault tolerant network routing system for mission critical distributed applications, 1997, IEEE, pp. 106–113.*

Brock, Tingle: A suite for monitoring networks, 1991, IEEE, pp. 235–242.*

Mehra et al., Resource management for real–time communication: making theory meet practice, 1996, IEEE, pp. 130–138.* www.erg.abdn.ac.uk/users/gorry/course/inet–pages/icmp.html, internet control message protocol, 2001, pp. 1–2.*

* cited by examiner

Primary Examiner—Krisna Lim
(74) Attorney, Agent, or Firm—Young & Thompson

(57) ABSTRACT

Detecting trouble in a real time communication on an IP network, and automatically bypassing a communication call performed between a transmission side node and a reception side node from a IP network to a public network.

10 Claims, 11 Drawing Sheets

IP DATAGRAM FORMAT AND FUNCTION

* PROTOCOL (8-BIT) : 1=ICMP, 6=TCP, 8=EGP, 17=UDP

Fig. 6

KIND OF ICPM MESSAGE

| TYPE | CONTENT |
|---|---|
| 00 | ECHO REPLY |
| 03 | DESTINATION UNREACHABLE |
| 04 | SOURCE QUENCH |
| 05 | REDIRECT |
| 08 | ECHO REQUEST |
| 11 | TIME EXCEEDED |
| 12 | PARAMETER PROBLEM |
| 13 | TIMESTAMP REQUEST |
| 14 | TIMESTAMP REPLY |
| 15 | INFORMATION REQUEST |
| 16 | INFORMATION REPLY |
| 17 | ADDRESS MASK REQUEST |
| 18 | ADDRESS MASK REPLY |

METHOD FOR CARRYING OUT REAL TIME BACKUP COMMUNICATION OF IP COMMUNICATION

BACKGROUND OF THE INVENTION

1. Field of the Invention

The present invention relates to a method for carrying out a real time backup communication of Internet Protocol (will be referred to as "IP" hereinafter) communication. More particularly, the present invention relates to a method for carrying out a real time backup communication of IP communication using a public network.

2. Description of the Related Art

In recent years, a real time communication begins to be used for data such as voice and animation on Internet, Intranet and Extranet (hereafter, they are referred to as "Internet network" or "IP network"). Activities of IETF standardization have become active with regard to the QoS (Quality Security) control for securing the quality of the real time communication as much as possible. The main items among them are as follows:

(1) RSVP (ReSource reservation Protocol): resource reservation protocol
(2) RTP (Real-time Transport Protocol)/RTCP (Real-time Transport Control Protocol): real-time communication control protocol
(3) DiffServe (Differentiated Service): priority control using IP header
(4) RTSP (Real-time Transport Streaming Protocol): stream data Control Protocol Only those QoS controls can not carry out the real time communication that is stable on the Internet network. For example, a real time communication call such as voice data, animation data and the like, from a transmission side node causes an error at a reception side node because of troubles of a network and a node connected to the Internet network. A real time communication that is a communication manner in a UDP (User Datagram Protocol) procedure that does not carry out a re-transmission control does not have means for detecting the trouble of the Internet network on the node side. Thus, it is impossible to judge whether the trouble results from an opposite node trouble or a network trouble.

Under such situation, a maintenance technician having a high ability who firstly detects the network trouble based on a communication error report from a user uses a method for transmitting an echo request message between nodes, and firstly checking the error based on an absence of a reply with regard to an echo answer message, and manually switching to a public network such as INS and the like, to thereby carry out a backup switching operation. The specification of the trouble reason necessary for the execution of this method requires the high maintenance technique of the maintenance technician. Moreover, the maintenance technician having such high technique needs to carry out a large number of processes to specify the network trouble and the communication trouble. Moreover, it takes a long time to carry out a series of trouble analyses from the user request to the manual operations by the maintenance technician having the high maintenance technique, which results in the large drop of related services.

Especially, associated with the down-sizing and flatting (horizontalizing) of the network resulting from the IP network in recent years, it is economically difficult to station the maintainers having the special and high techniques for respective small many networks existing in an enterprise. So, a system begins to be required in which even a maintainer holding another low typical service, namely, an amateurish maintainer assigned in each department can quickly specify the trouble reasons. In other words, the desire to establish a mechanism for economically insuring a reliability of the IP network has become popular in which the drop of the communication quality caused by the network trouble and the network delay time in the Internet network that is very economic although it is low in reliability and quality can be monitored on a user equipment side by using a cheap method, and it is possible to carry out a stable continuous communication of a real time communication call.

A related technique is disclosed in Japanese Laid Open Patent Application (JP-A-Heisei, 10-224408) as "COMMUNICATION SYSTEM". First and second communication apparatuses in this communication system have switching means, data format converting means and switching control means. The switching means contains a plurality of communication lines including a call path highway provided with a plurality of channels, which are connected to public networks, dedicated lines and inner terminals. The data format converting means connects a computer network and the call path highway, and converts a format of a transmission data between the computer network and the call path highway, and also transmits and receives a data to and from a destination communication apparatus through the computer network. The switching control means transmits and receives a call control information to and from the destination communication apparatus through the computer network, and also controls the switching means and the data format converting means so as to establish the connection using the computer network, in accordance with the data kinds at a terminal on a transmission side and a terminal on a reception destination. According to this communication system, a mutual communication can be done between the terminals, in which the data kinds are different from each other, by using the computer network without a manual operation.

Japanese Laid Open Patent Application (JP-A-Heisei, 10-65737) discloses "SUBSTITUTE SERVER APPARATUS AND SERVER APPARATUS". The substitute server apparatus contains: means for carrying out a PPP connection through a public network between a network and the server apparatus, by dynamically assigning an IP address in accordance with a specified server apparatus name and a telephone number in a corresponding public network, between the network and the server apparatus; and means for accessing the server apparatus by using the dynamically assigned IP address. Accordingly, with regard to the server apparatus to be connected to the network managed by the IP address through the public network, even if it is not connected to the network at a time of the communication request and further the IP address is not determined, it is possible to connect the server apparatus to the network and dynamically assign the IP address and further communicate with the dynamically assigned IP address based on the server apparatus name.

Moreover, Japanese Laid Open Patent Application (JP-A-Heisei, 9-130429) discloses "COMMUNICATION SYSTEM". In this communication system, a line/packet converter is connected between a computer network and a call path highway in a private switch. A computer terminal transmits and receives a call control packet to and from the private switch through the computer network. The line/packet converter converts a format of a transmission data between the computer network and the call path highway. Accordingly, it is possible to connect the computer network, a subscriber line, and an extension line so that the computer terminal can communicate with another communication terminal through a public network and an extension line network.

SUMMARY OF THE INVENTION

Therefore, an object of the present invention is to provide a method for carrying out a real time backup communication of IP communication, which can protect a drop of a communication quality caused by a network delay time and a network trouble in an Internet network that is very economic, by using a cheap and simple method.

Another object of the present invention is to provide a method for carrying out a real time backup communication of IP communication, which can attain a technique for economically insuring a reliability of an Internet network by executing a real time communication stably and continuously.

Means for solving the above-mentioned problems are explained as follows. A number, a symbol or the like together with parentheses "( )" is given to a technical item appearing in the explanation. The number, the symbol or the like coincides with a reference number, a reference symbol or the like given to a technical item constituting at least one embodiment or an example among a plurality of embodiments or a plurality of examples in the present invention, especially a technical item illustrated in a drawing corresponding to the embodiment or the example. Such reference numbers and reference symbols evidently denote a corresponding relation between the technical item noted in the claims and the technical item in the embodiment or the example. Such corresponding relation does not imply the interpretation that the technical item noted in the claims is not limited to the technical item in the embodiment or the example.

A method for carrying out a real time backup communication of IP communication according to the present invention comprises a step of detecting an occurrence of a trouble in a real time communication on an IP network (100) connecting between a transmission side node (120) and a reception side node (130), and a step of automatically bypassing a communication call of the real time communication performed between the transmission side node (120) and the reception side node (130), from the IP network to a public network (110), based on the detection. Such a bypass operation enables the continuation of the real time communication. The occurrence implies a generation of a delay time to the extent that the quality of the real time communication can not be secured. ICMP is used for the periodical transmission and reception.

There may be a case that a real time communication call is newly generated during the course of the real time communication. In this case, the bypass operation of the new real time communication call to the public network (110) is performed to thereby enable the real time communication. If the trouble is recovered, the real time communication is returned from the public network back to the IP network.

There may be a case that the trouble is induced even in the public network. During the bypass operation, the occurrence of the trouble is detected in the real time communication on the public network connecting between the transmission side node and the reception side node. The detection is executed by detecting a time in the periodical transmission and reception with regard to an echo request message and an echo answer message between the transmission side node (120) and the reception side node (130). In the detection during the bypass operation, if the echo request message is normally received while the trouble is induced on the public network (110), it is judged that the public network (110) is normal and the node (120 or 130) is abnormal.

The detection on the IP network (100) is executed by detecting the time of the periodical transmission and reception with regard to the echo request message and the echo answer message between the transmission side node (120) and the reception side node (130). In the detection, if the echo answer message is normally replied, it is judged that the IP network (100) has no trouble and the node (120 or 130) has a trouble. Typically, the discrimination between the trouble in the node (120, 130) and the trouble on the IP network (100) can be done by detecting the recovery of the trouble on the IP network (100) and detecting the occurrence of the trouble in the real time communication on the public network (110).

BRIEF DESCRIPTION OF THE DRAWINGS

FIG. 6 shows a kind of ICMP message;

DESCRIPTION OF THE PREFERRED EMBODIMENTS

Figure 1:
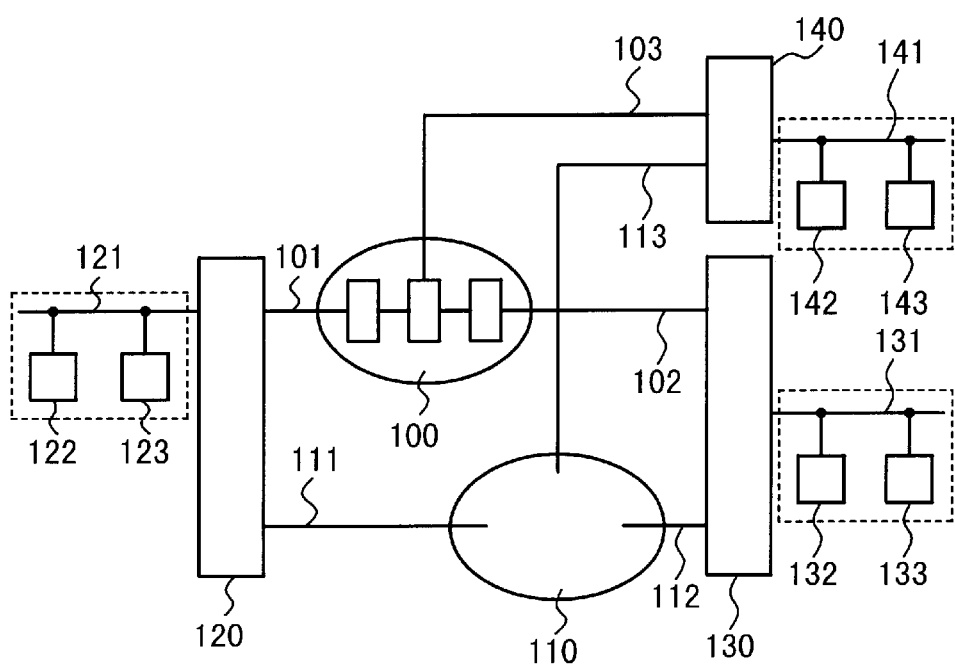
FIG. 1 shows a circuit block diagram used in an embodiment of a method for carrying out a real time backup communication of IP communication according to the present invention.

Coinciding with and corresponding to the drawings, in an embodiment of a method for carrying out a real time backup communication of IP communication according to the present invention, a public (line) network 110 is provided together with an IP network 100. As shown in FIG. 1, a transmission side node 120 is connected through an IP side first connection interface 101 to the IP network 100. The IP network 100 is connected through an IP side second connection interface 102 and an IP side third connection interface 103 to a reception side first node 130 and a reception side second node 140, respectively.

The transmission side node 120 is connected through a public network side first connection interface 111 to the public network 110. The public network 110 is connected through a public network side second connection interface 112 and a public network side third connection interface 113 to the reception side first node 130 and the reception side second node 140, respectively.

A transmission side voice terminal 122 and a transmission side animation terminal 123 are connected to a transmission side LAN 121. The transmission side LAN 121 is connected to the transmission side node 120. A first reception side voice terminal 132 and a first reception side animation terminal 133 are connected to a first reception side LAN 131. The reception side LAN 131 is connected to the reception side first node 130. A second reception side voice terminal 142 and a second reception side animation terminal 143 are connected to a second reception side LAN 141. The second reception side LAN 141 is connected to the reception side second node 140.

In the real time communication such as a multi-media communication in which voice data and animation data are transmitted and received, TCP (Transmission Control Protocol) is not used, because the TCP bring about a delay by a message re-transmission when a communication error is induced. The TCP is defined by setting a *protocol field (refer to FIG. 5) to "06" in Hexadecimal Number. Then, UDP (User Datagram Protocol) is used, because the UDP does not bring about the re-transmission even if an error is induced. The UDP is defined by setting a *protocol field (refer to FIG. 5) to "17" in Hexadecimal Number.

Figure 2:
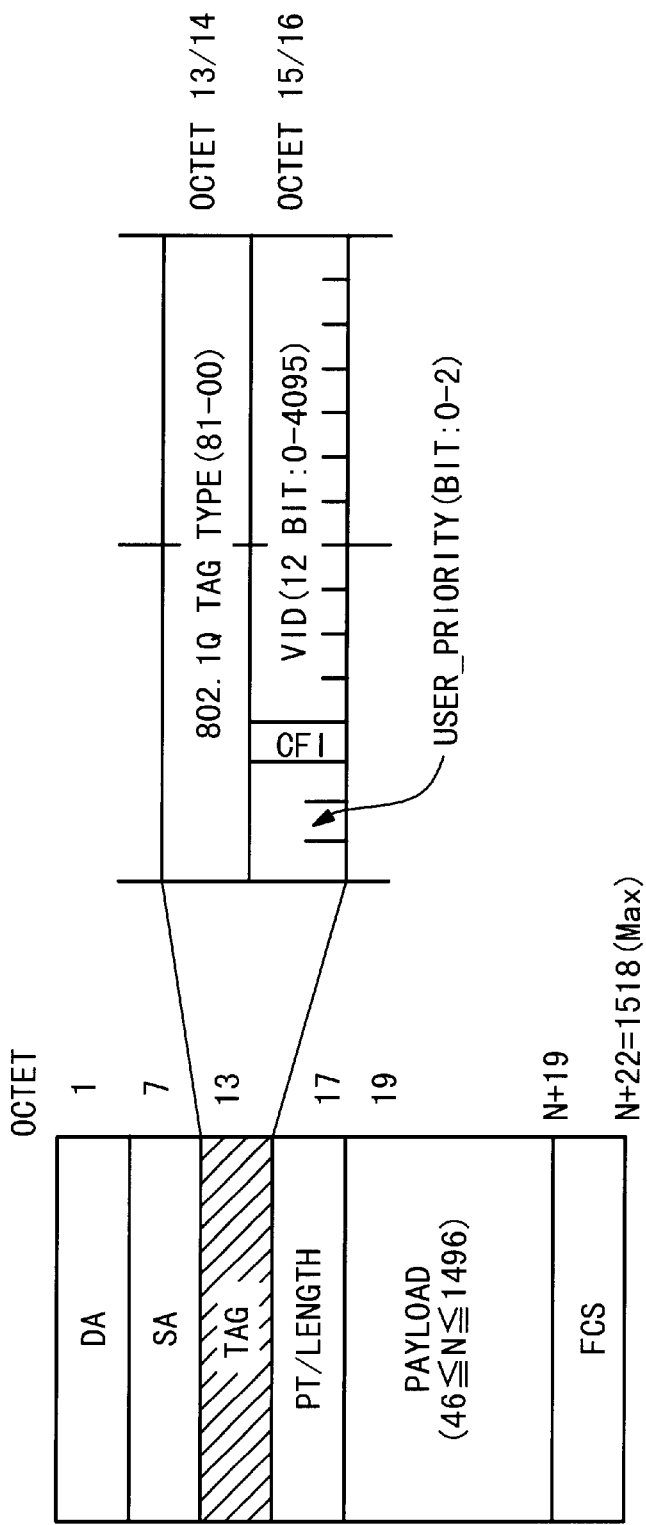
FIG. 2 shows a data configuration of Ethernet Frame with Tag of IEEE 802.1Q.

The voice terminal 122 and the animation terminal 123 which are connected to the LAN 121 are operated in accordance with "Ethernet Frame with Tag of IEEE 802.1Q" shown in FIG. 2. When the voice and animation having a high real time property is transferred, a three bits User Priority field formed in a Tag field of this Ethernet Frame is set to a value having the highest priority.

Figure 3:
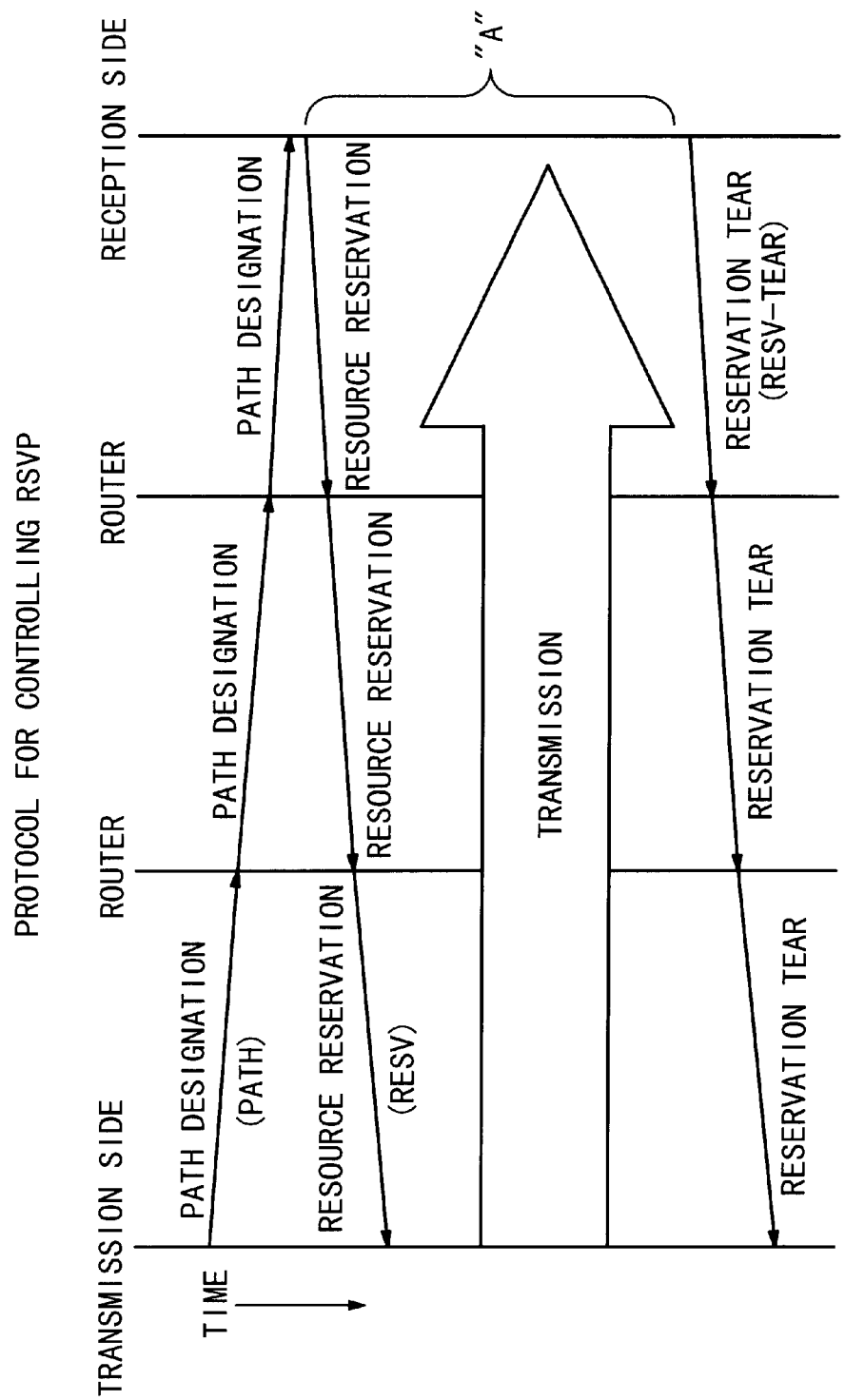
FIG. 3 shows a time chart representing a method for controlling RSVP.
Figure 4:
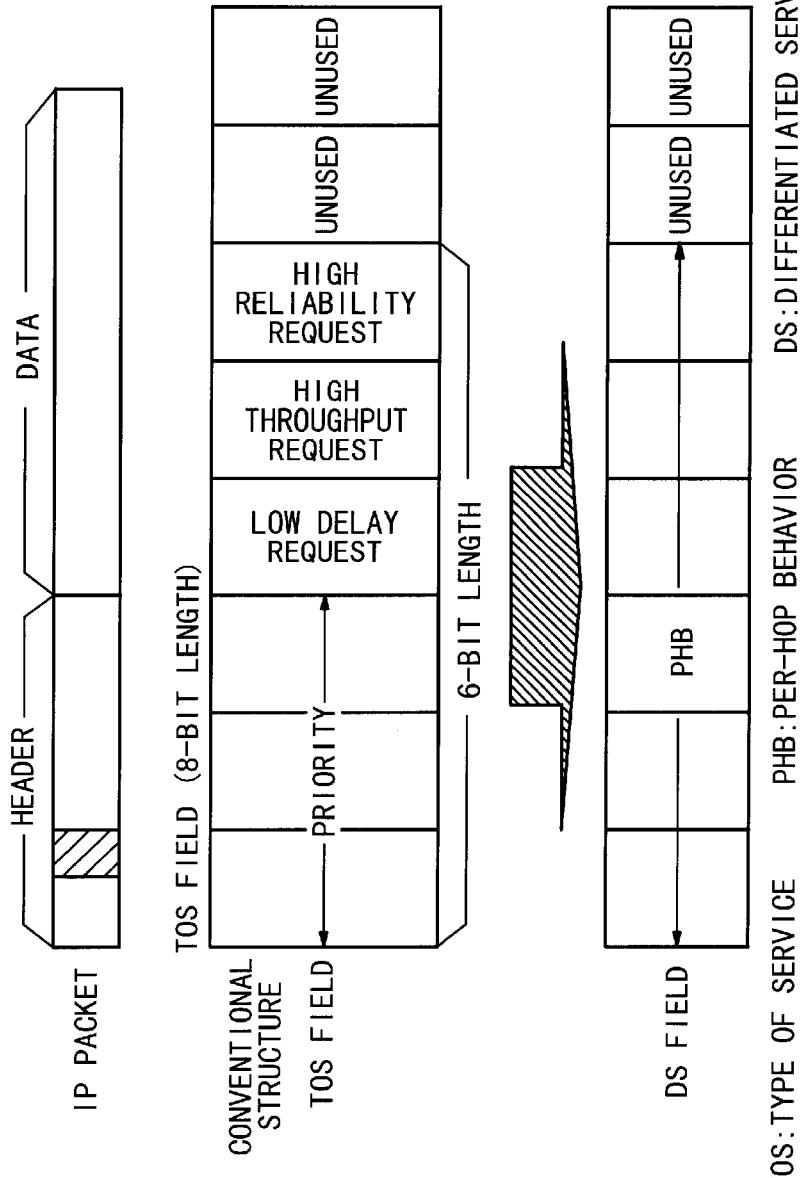
FIG. 4 shows a data configuration indicating a field format with regard to a priority control in a conventional technique and the present invention.

The IP network 100 has the configuration to enable the controls such as RSVP (ReSource reservation Protocol) shown in FIG. 3, DiffServe (Differentiated Services), a QoS setting at IP over ATM and the like. In a section "A" of FIG. 3, a resource reservation message is periodically sent out and a securing of resources is continued. RSVP is used for a control, e.g. a signaling control for interpolating a network layer (IP), to enable QoS (Band Security) for a voice and animation having a high real time property and is a protocol to reserve a network resource in a single direction under an instruction on a reception side for receiving an information. DiffServe is a priority control service based on a contract between a user and an ISP (Internet Service Provider). To realize a priority control by using IP header, a TOS (Type Of Service) field (8-bit length) in an IP header which is shown in FIG. 4 and was not almost used, is again defined as a Differentiated Services field. The higher 6 bits of the Differentiated Services field is named as a PHB (Per-Hop-Behavior) field and three bits among the higher 6 bits can be used to set a six-level priority.

Moreover, the IP network 100 is provided with an RTP/RTCP (Real-time Transport Protocol/Real-time Transport Control Protocol) and an RTSP (Real-time Transport Streaming Protocol). The RTP/RTCP is a real time communication control protocol for carrying out a synchronous control between media and a control of a reproduction speed on a reception side, by giving a sequence number and physical time information for each message to a header from a transmission side terminal, in order to improve a real time communication quality between the terminals, namely, between an application and a transport layer, independently of a network. Also, the RTSP (Real-time Transport Streaming Protocol) is a stream data control protocol for dynamically informing a communication speed and a display quality, such as a resolution and a number of animation frames per second from the reception side, to the transmission side.

It may be considered that a real time telephone communication is done between the transmission side voice terminal 122 on the LAN 121 and the first reception side voice terminal 132 on the first reception side LAN 131, through the IP network 100. The transmission side voice terminal 122 sets DA (Destination Address) corresponding to the first reception side voice terminal 132 for "Ethernet Frame with IEEE 802.1Q Tag" shown in FIG. 2, and sets the highest priority bit in the User Priority field of the Tag, and then transmits to the transmission side node 120.

The transmission side node 120 converts the DA (Destination Address) on the transmission side LAN 121 into an IP number (IP number of the reception side first node 130) corresponding to the first reception side voice terminal 132, and simultaneously detects the highest priority bit in the User Priority field, and then maps to the QoS control (RSVP, DiffServe or IP over ATM) of the IP network 100.

As an example, a case is described in which the transmission side node 120 sets the highest priority bit to the three bits in the PHB field of the IP header in the DiffServe of FIG. 4 and then transmits to the IP network as the QoS control. As a result, as shown in FIG. 1, it is possible to reserve the real time communication in which the QoS is reserved up to the transmission side voice terminal 122—the transmission side LAN 121—the transmission side node 120—the IP side first connection interface 101—the IP network 100—the IP side second connection interface 102—the reception side first node 130. Moreover, the reception side first node 130 sets the highest priority bit to the User Priority field in the Tag and the DA corresponding to the first reception side voice terminal 132 into "Ethernet Frame with 802.1Q Tag" shown in FIG. 2, and transmits it from the internal LAN 131 to the first reception side voice terminal 132. Thus, it is possible to attain the real time communication based on the QoS control through the IP network 100 between the transmission side voice terminal 122 and the first reception side voice terminal 132.

Figure 5:
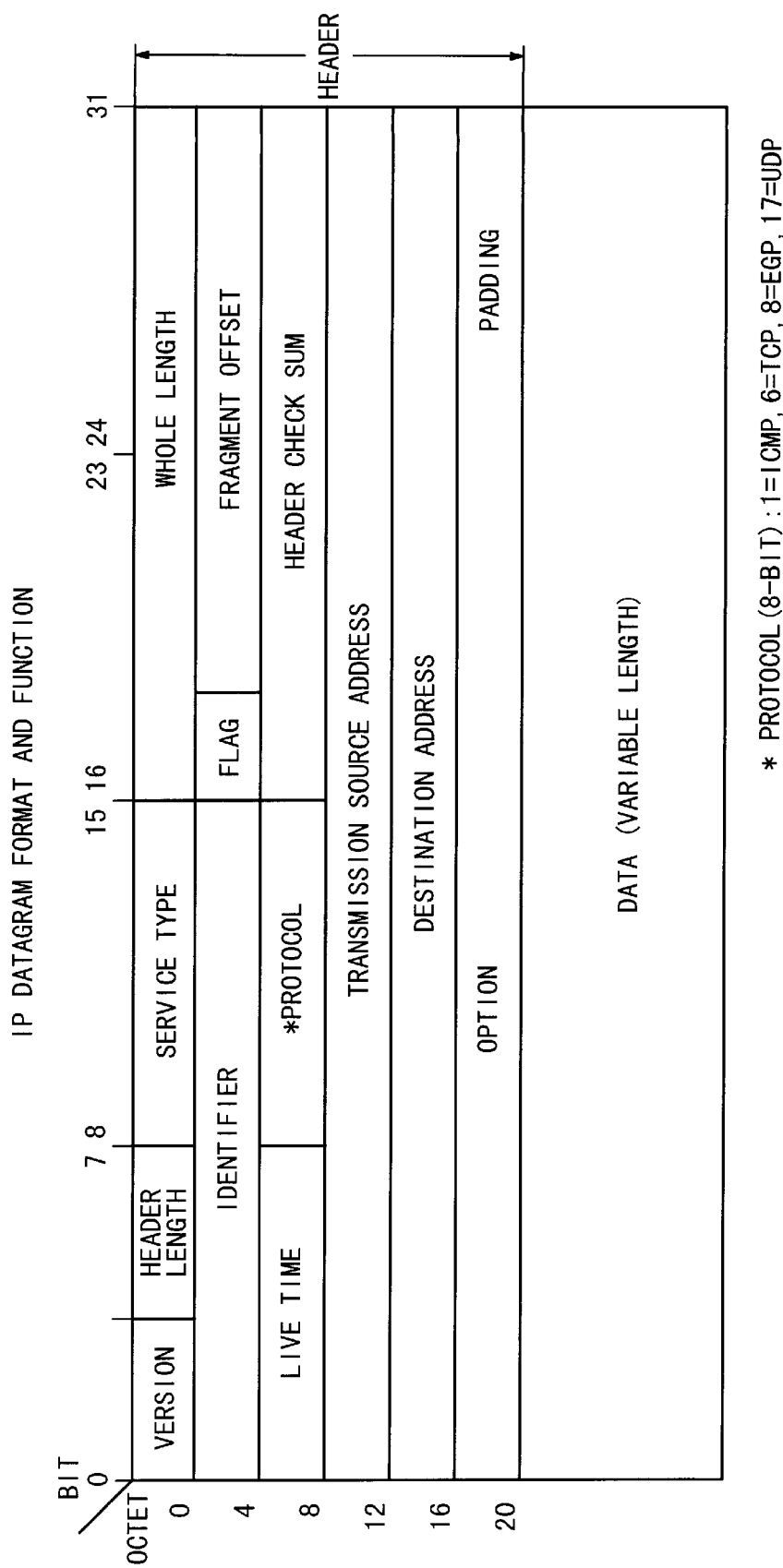
FIG. 5 shows an IP datagram format and function.
Figure 7:
FIG. 7 shows an echo answer message and an echo request message format in ICMP.

If 8 bits in a *protocol shown in FIG. 5 is "01"in Hexadecimal Number, ICMP (Internet Control Message Protocol) is specified as shown in FIGS. 6 and 7. If 8 bits of "type" shown in FIGS. 6 and 7, which represents a message type, are "08" in Hexadecimal Number, this indicates an echo request, and if "00", this indicates an echo answer. An echo function including the echo request and the echo answer is used when it is checked whether or not a host or a node connected to the IP network 100 is active. Thus, if a certain host or node transmits an echo request of a message type "08", a specified host or node repeats an echo answer of a message type "00", when it is in the state which can respond. The operational check using such an echo is frequently done. The echo request is transmitted by using a utility program typically referred to as a ping.

Figure 8:
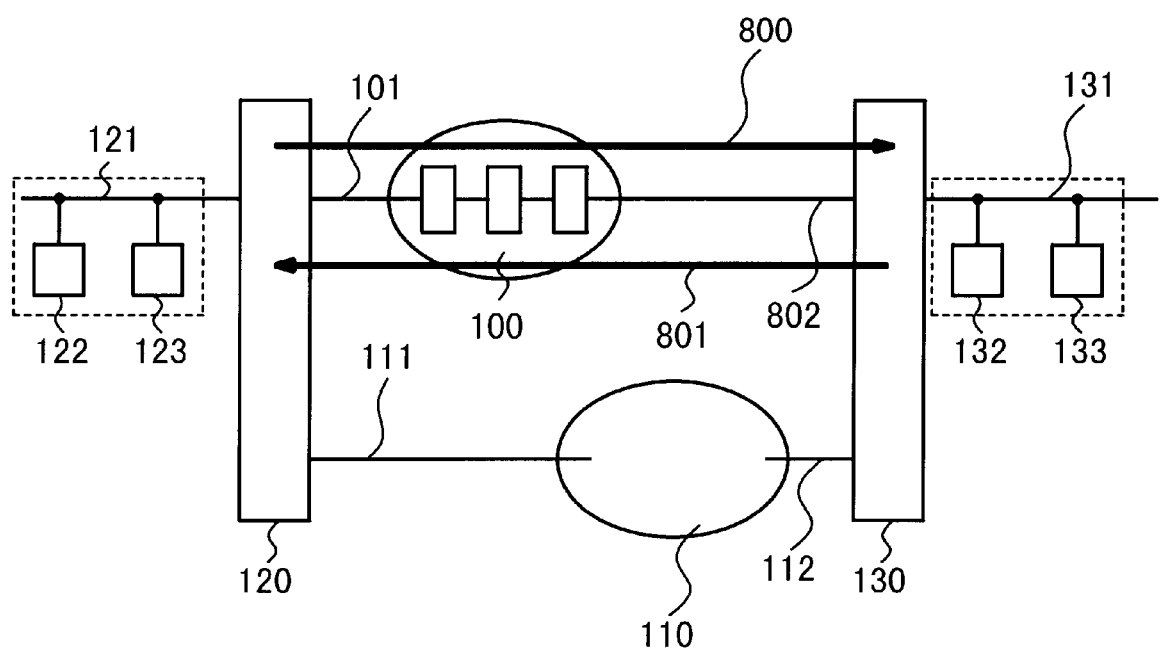
FIG. 8 is a circuit block diagram showing a part of operation signals of FIG. 1.

As shown in FIG. 8, the transmission side node 120 sets an IP address number of the transmission side node 120 to a transmission source address field shown in FIG. 5, sets an IP address number of the node 130 into a destination address field, sets "01" in Hexadecimal Number (ICMP) to the *protocol, and further sets "08" in Hexadecimal Number (the echo request shown in FIG. 6) to the message type field shown in FIG. 7, and then transmits an echo request message 800 of FIG. 8, in which a test data for a loop back is set to a data (variable length) field of FIG. 7, through the IP network 100 to the reception side first node 130.

The reception side first node 130, when receiving the echo request message 800 of FIG. 8, sets the IP address number of the reception side first node 130 into the transmission source address field of FIG. 5, sets the IP address number of the transmission side node 120 into the destination address field, sets "01"in Hexadecimal Number (ICMP) into the *protocol field, and further sets "00" in Hexadecimal Number (the echo answer of FIG. 6) into the message type field of FIG. 7, and copies the test data for a loop back, which is written to a data field of the received echo request message 800 of FIG. 8, to the data field (the variable length) in its original state, and then sends back to the transmission side node 120 as an echo answer message 801 of FIG. 8. Thus, the transmission side node 120 that is the transmission source node can check the state of the transmission and reception of the data through the loop back test and also detect the troubles of a network and a node on a route in the transmission side node 120—the IP side first connection interface 101—the IP network 100—the IP side second connection interface 102—the reception side first node 130. Simultaneously, the transmission side node 120 can check that the excellent quality of the real time telephone communication can be reserved if a round trip time until the reception of the echo answer message 801 sent back from the reception side first node 130 after the transmission side node 120 transmits the echo request message 800 is within a time capable of reserving quality of a real time communication, example, if it is within 150 msec defined by ITU-TG.114.

Under such premise conditions, when the transmission side voice terminal 122 shown in FIG. 1 carries out the real time communication with the first reception side voice terminal 132 through the transmission side LAN 121, the transmission side node 120, the IP side first connection interface 101, the IP network 100, the IP side second connection interface 102, the reception side first node 130 and the first reception side LAN 131, the transmission side node 120 receives the Ethernet frame with the Tag shown in FIG. 2 coming from the transmission side LAN 121. Then, the highest priority detection of the QoS is done in accordance with the User Priority within the Tag. Accordingly, a conversion from the DA into the IP address number of the first reception side voice terminal 132 is executed.

At the same time, as shown in FIG. 10A, a voice data packet coming from the transmission side LAN 121 to the transmission side node 120 causes a time-over counter for detecting a voice data packet disconnection shown in FIG. 10B to be cleared, and it is switched to a voice communication mode (L level). Here, FIG. 10A shows the voice data packet between the voice terminal 122→the LAN 121→the node 120 in case of the real time communication to the voice terminal 132 from the voice terminal 122. Also, FIG. 10B shows an output of the time over counter for a voice data packet disconnection detection between LAN 121→node 120 (L level represents in being voice communication, H level represents in not being voice communication).

After that, in order to reserve the real time communication from the transmission side LAN 121 to the transmission side node 120, the time-over counter is cleared for each voice data packet which comes always, within a certain time in succession, and the voice communication mode (L level) is continued.

Figure 9:
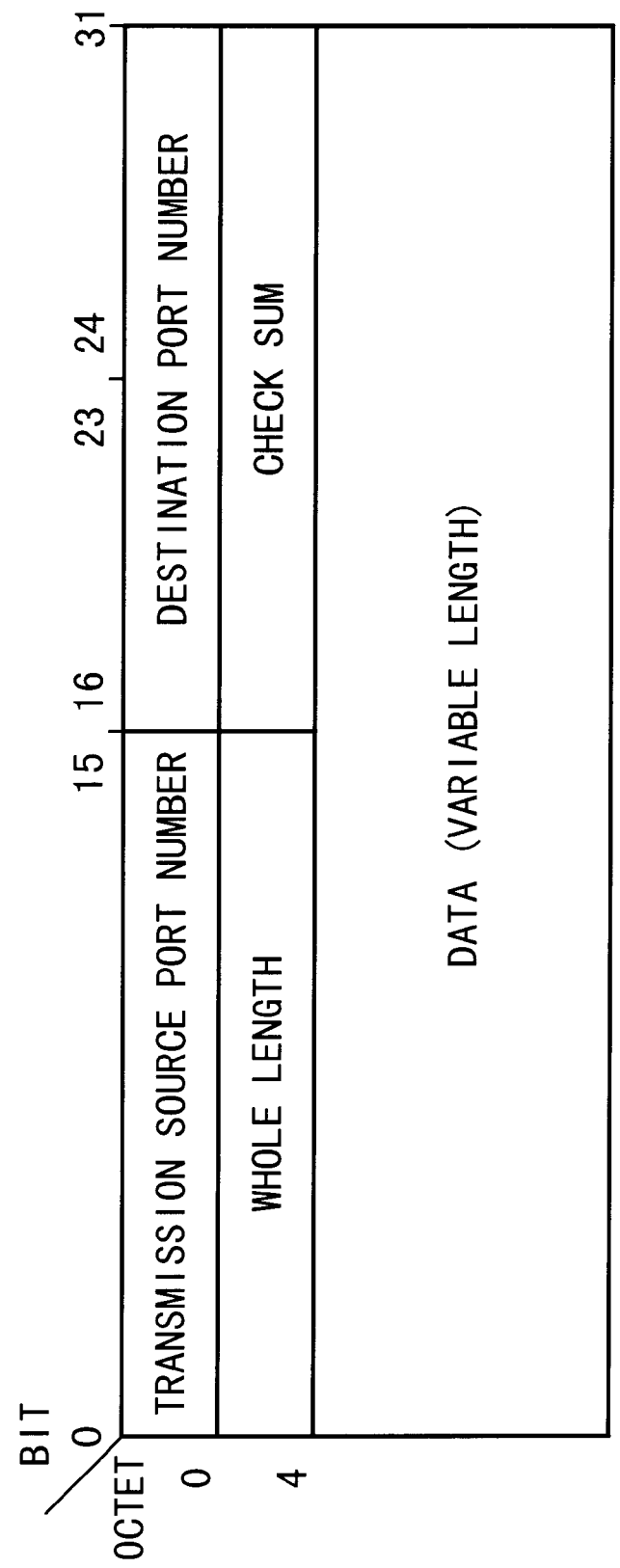
FIG. 9 shows a data configuration indicating a message format of UDP.

Associated with the end of the voice communication, since the signal to clear the time-over counter does not issue, the time-over counter causes the time-over. Therefore, it is switched to a non-call mode (H level). The transmission side node 120 sets the highest priority bit for the three bits in the PHB field of the IP header in the DiffServe shown in FIG. 4 as the QoS control, sets "17" in Hexadecimal Number (UDP) to the *protocol field of FIG. 5, sets the IP address number of the transmission side node 120 accommodating the transmission side voice terminal 122 to the transmission source address field, sets the IP address number of the reception side first node 130 accommodating the first reception side voice terminal 132 to the destination address field, and copies a voice data at a payload in the Ethernet frame with IEEE 802.1Q Tag shown in FIG. 2 to the data field (variable portion) of the UDP in the transport layer of FIG. 9, and then transmits through the IP network 100 to the reception side first node 130. The reception side first node 130 transmits this received voice data to the first reception side voice terminal 132, by detecting a real time communication call, namely, the QoS control request call, in accordance with a destination port number of the UDP of FIG. 9, namely, an application, and the priority bit of three bits in the PHB in the IP header of FIG. 4, and then setting the highest priority bit in the User Priority field in the Ethernet frame with IEEE 802.1Q Tag of FIG. 2 on the first reception side LAN 131. As a result, the real time communication securing the QoS can be done between the transmission side voice terminal 122 and the first reception side voice terminal 132.

At the same time, the transmission side node 120, as the QoS control, sets the highest priority bit for the three bits in the PHB field of the IP header in the DiffServe of FIG. 4, sets "01" in Hexadecimal Number (ICMP) to the *protocol field of FIG. 5, sets the IP address number of the transmission side voice terminal 122 to the transmission source address field, sets the IP address number of the first reception side voice terminal 132 (the IP address number of the reception side first node 130) to the destination address field, sets "08" in Hexadecimal Number (echo request) to the message type field of FIG. 7, and transmits the echo request message 800 of FIG. 8, in which the test data for loop back is set for the data field (variable length), through the IP network 100 to the reception side first node 130.

After that, this echo request message 800 is periodically transmitted for each constant interval (period) shown in FIG. 10C, in the voice communication mode at which an output from the time-over counter is at the L level. Here, FIG. 10C represents a sending-out time range and a sending-out interval of the echo request message 800 of FIG. 8 in ICMP. The transmission side node 120 detects whether or not the round trip time until the reception of the echo answer message 801 sent back from the reception side first node 130 within the constant time in FIG. 10C is within a time in which the quality of the real time communication can be reserved, by using the time-over counter shown in FIG. 10D. Here, FIG. 10D represents a delay time from the transmitting of FIG. 10C to the reception of the echo response message 801 of FIG. 8. In FIG. 10D, "E" represents a case of the occurrence of the time over because the delay time from the transmitting of FIG. 10C to the reception of the echo response message 801 is large, and "F" represents a case of the occurrence of the time over because of being not received the echo response message 801. Then, it judges that the trouble results from the IP or the opposite node 130, if the echo answer message 801 after an elapse of the round trip time is not received as shown in E of FIG. 10D and if the echo answer message 801 is not replied as shown in F of FIG. 10D.

In this case, the transmission side node 120 converts the IP address number of the first reception side voice terminal 132 at the connection destination (the IP address number of the reception side first node 130) into a telephone number of the public network 110, and then reserves a backup bypass route up to the transmission side node 120—the public network side first connection interface 111—the public network 110—the public network side second connection interface 112—the reception side first node 130, through the public network connection based on a dialup. The transmission side node 120 transmits an echo request message 1100 of FIG. 11 through the public network 110 after the backup switch bypass operation, to the reception side first node 130, and then judges that the IP network 100 is abnormal and the reception side first node 130 is normal if the echo answer message 1101 from the reception side first node 130 is replied within an allowable time, and judges that the reception side first node 130 is abnormal if the echo answer message 1101 is not replied. So, it can request an emergent treatment if detecting the trouble in the reception side first node 130.

Figure 10:
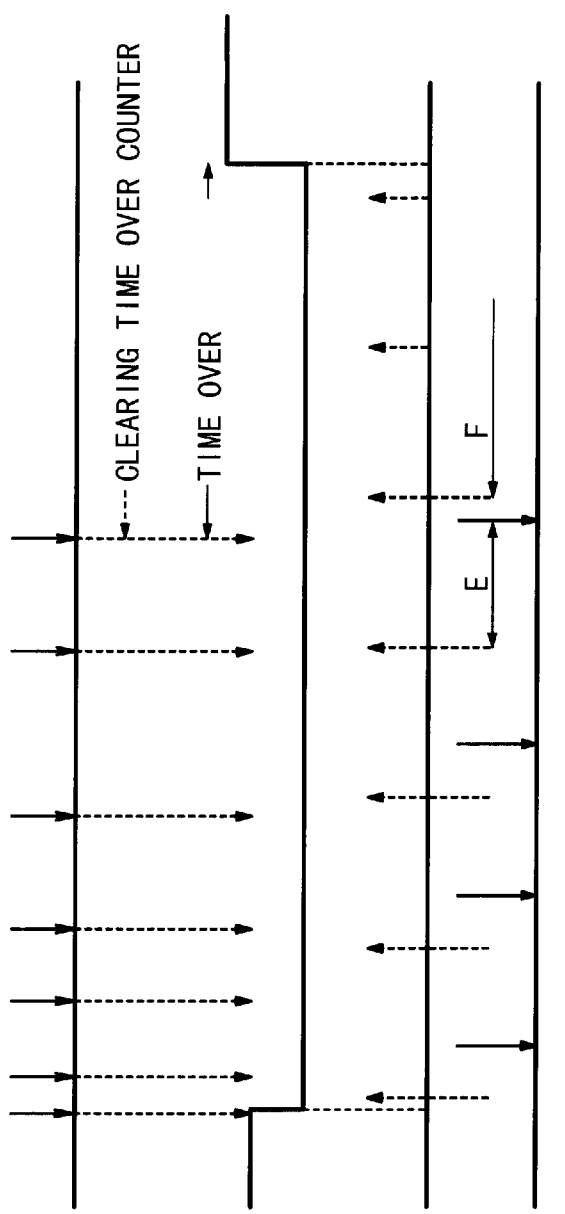
FIGS. 10A, 10B, 10C and 10D show a timing chart of a signal flow of detecting a delay of an answer.
Figure 11:
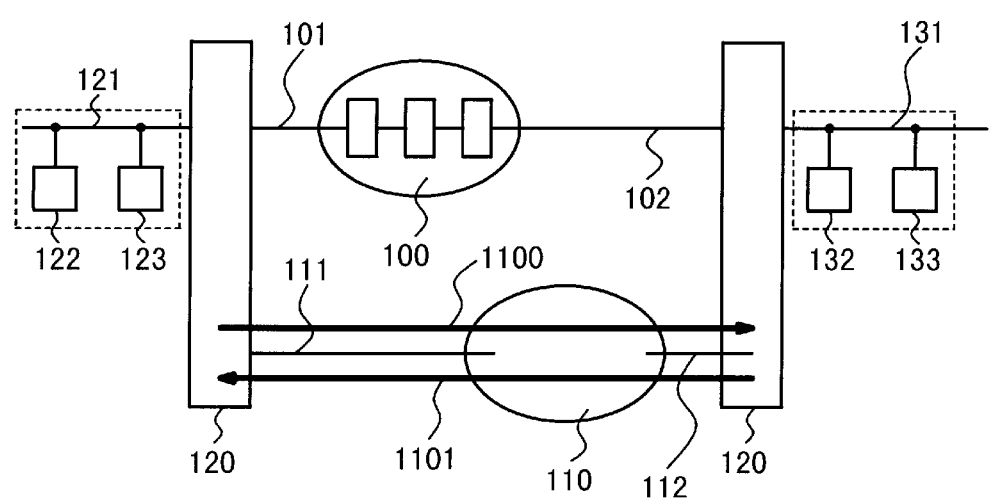
FIG. 11 shows a circuit block diagram of a well-known apparatus.

Moreover, in order to continuously monitor the normal conditions with regard to the reception side first node 130 and the public network 110 through the communication route of the public network 110 during the real time communication resulting from this backup bypass operation, this is designed such that the operations perfectly equal to those in the series of configurations shown in FIGS. 8, 10 are also applied to a public network 110 in FIG. 11, namely, the echo request message 800 is replaced by an echo request message 1100 of FIG. 11, and the echo answer message 801 is replaced by an echo answer message 1101 of FIG. 11.

At the same time, the transmission side node 120, in order to monitor the normal recovery from the network congestion, in which the IP delay time caused by the IP network disconnection/abnormal trouble and the round trip time-over is equal to or longer than a specified time, changes the condition shown in FIG. 10B into the IP trouble (including the round trip time-over) condition between the transmission side node 120 and the reception side first node 130, namely, a condition that FIG. 10B is forcedly switched to the L level at the time of the network trouble, and periodically transmits the echo request message 800 for each constant interval (period) shown in FIG. 10C.

The transmission side node 120, after the transmission of the echo request message 800 of FIG. 8, namely, FIG. 10C, detects whether or not the round trip time until the reception of the echo answer message 801 sent back from the reception side first node 130 within the constant time is within the time in which the quality of the real time communication can be reserved, by using the time-over counter in FIG. 10D, and then continues to receive the echo answer message 801 after an elapse of an allowable limit time of the round trip time as shown in E of FIG. 10D or monitor until the recovery of the continuously (stably) normal state after the current trouble condition that the echo answer message 801 is not replied as shown in F of FIG. 10D. That is, this implies the continuation of the monitor until the IP network 100 between the transmission side node 120 and the reception side first node 130 recovers the normal state, even after the completion of the communication through the backup bypass operation between the transmission side node 120 and the reception side first node 130. The backup bypass operation through the public network 110 is done if a communication call to the reception side first node 130 is newly generated during the continuous monitor.

After the check of the recovery of the normally stable state in the IP network 100, if the real time communication is done through the public network 110 from the transmission side node 120 to the reception side first node 130, switching to the IP network 100 whose normal state is recovered enables the communication to be done further economically. In this case, when the recovery to the normally stable state is detected, the IP trouble condition in FIG. 10B, namely, the forced L level condition in FIG. 10B implying the network trouble state is once cleared and returned back to the H level implying the initial state. So, at a time of a start of the communication call to the IP, the monitor of the trouble in the IP network 100 is designed to be done in accordance with a normal sequence from FIG. 10A. It is also natural that the switching from the public network 110 to the IP network 100 is quickly done when the IP network 100 recovers the normal state and then the series of typical real time communications is done through the IP network 100, as mentioned above.

In the above-mentioned embodiment, it is described that the transmission side node 120 is used as the calling side and the reception side first node 130 is used as the called side. However, if the transmission side node 120 is used as the called side and the reception side first node 130 is used as the calling side, the transmission side node 120 can know that the reception call is the real time communication call, from the port number of the UDP, namely, the application number, or the highest priority setting of the DiffServe priority bit in the PHB field in the IP header of FIG. 4. So, the execution of the operations perfectly equal to the series of operations in FIGS. 10A to 10D and the series of operations in the echo request message 1100 and the echo answer message 1101 with regard to FIG. 11 enables the monitor of the IP trouble having the symmetry between the nodes, the monitor of the allowable delay time, the quick detection of the trouble and the maintenance.

In the above-mentioned explanation, the IP is described as the Internet network, for the purpose of easy explanation. However, it can include the intra-network and the extra-network. The real time communication in the IP in which the QoS is secured is described in the above-mentioned explanation. However, it is possible to configure by using the currently popular IP (Internet) network that is the best effort in which the QoS is not secured. So, the delay time is monitored by monitoring the round trip time. Then, if it exceeds the limit time, the backup bypass operation to the public network is done to thereby enable the real time communication to be further economically done.

In addition to the above-mentioned basic operations, MP (The PPP Multilink Protocol) is effective in order to reserve the stable quality of the communication that is easy and smooth, by solving the delay time and the packet loss in the real time communication call induced in the backup switching or returning back operation when the trouble is induced in the IP (Internet) network 100 and then the normal state is recovered.

In the method for carrying out a real time backup communication of IP communication according to the present invention, if the IP trouble is induced and the delay time is induced to the extent that the quality of the real time communication can not be secured, it is treated as the real time communication trouble, and the backup switching bypass operation can be automatically done to the public network 110. Moreover, in addition to the economically large effect of enabling the real time communication that is stable and high in quality on the very economical IP although it is low in reliability and quality. So, this method can provide the largely economical effect that even a low-grade maintainer, namely, a maintainer holding another typical service can carry out the maintenance operation without stationing the maintainer having the high technique, and can quickly specify the trouble point and reduce the recovery time. Thus, it can improve the quality of the communication service and obtain the economical effect.

What is claimed is:

1. A method for carrying out a real time backup communication of Internet Protocol (IP) communication, comprising:

detecting a trouble in a real time communication on an IP network through which a transmission side node and a reception side node are connected; and automatically bypassing a communication call of said real time communication performed between said transmission side node and said reception side node from said IP network to a public network, based on said detecting result, wherein said trouble is an occurrence of a delay time to an extent that a quality of said real time communication cannot be secured, and said step of detecting the trouble of the real time communication on said IP network includes detecting a time period from a transmission of an echo request message to a reception of an echo answer message between said transmission side node and said reception side node on said IP network.

2. The method according to claim 1, wherein Internet Control Message Protocol (ICMP) is used in said transmission of said echo request message and said reception of said echo answer message.

3. The method according to claim 1, wherein said step of detecting the time period further includes judging whether said IP network is normal or said node is abnormal, if said echo request message is normally replied.

4. The method according to claim 1, further comprising:

automatically bypassing a new communication call occurring while said bypassing operation to said public network is performed.

5. The method according to claim 1, further comprising:

detecting a trouble in a real time communication on said public network through which said transmission side node and said reception side node are connected, while said bypassing operation is performed.

6. The method according to claim 5, wherein said step of detecting the trouble of the real time communication on said public network includes detecting a time period from a transmission of an echo request message to a reception of an echo answer message between said transmission side node and said reception side node on said public network.

7. The method according to claim 6, wherein Internet Control Message Protocol (ICMP) is used in said transmission of said echo request message and said reception of said echo answer message.

8. The method according to claim 5, wherein said step of detecting the time period further includes judging whether said public network is normal or said node is abnormal if said echo request message is normally replied during the occurrence of said trouble on said public network.

9. The method according to claim 1, further comprising:

detecting a recovery of the trouble in the real time communication on said IP network; and returning a communication call of said real time communication from said public network onto said IP network, based on said detecting result of the recovery.

10. The method according to claim 9, further comprising:

distinguishing the trouble of said node and the trouble of said IP network, based on the detection of the recovery of said trouble on said IP network and the detection of the occurrence of the trouble of the real time communication on said public network.

* * * * *